United States Patent
Tharp

(10) Patent No.: US 8,061,689 B2
(45) Date of Patent: Nov. 22, 2011

(54) DISK DIFFUSER WITH IMPROVED SEAL

(75) Inventor: Charles E. Tharp, Columbia, MO (US)

(73) Assignee: Environmental Dynamics, Inc., Columbia, MO (US)

( * ) Notice: Subject to any disclaimer, the term of this patent is extended or adjusted under 35 U.S.C. 154(b) by 997 days.

(21) Appl. No.: 11/967,337

(22) Filed: Dec. 31, 2007

(65) Prior Publication Data

US 2009/0166901 A1     Jul. 2, 2009

(51) Int. Cl.
*B01F 3/04*     (2006.01)
(52) U.S. Cl. ............................. 261/122.1; 261/DIG. 70
(58) Field of Classification Search ............... 261/121.1, 261/122.1, DIG. 70
See application file for complete search history.

(56) References Cited

U.S. PATENT DOCUMENTS

| | | | |
|---|---|---|---|
| 4,288,394 A | 9/1981 | Ewing et al. | |
| 5,378,355 A | 1/1995 | Winkler | |
| 6,464,211 B1 | 10/2002 | Downs | |
| 6,811,148 B2 * | 11/2004 | Frankel et al. | 261/122.1 |
| 7,311,299 B2 * | 12/2007 | Sasajima | 261/122.1 |
| 2004/0124550 A1 | 7/2004 | Casper et al. | |

FOREIGN PATENT DOCUMENTS

| | | |
|---|---|---|
| DE | 3829666 A1 | 3/1990 |
| WO | 2005115929 A | 12/2005 |

* cited by examiner

*Primary Examiner* — Robert A Hopkins
(74) *Attorney, Agent, or Firm* — Husch Blackwell LLP

(57) ABSTRACT

A flexible membrane disk diffuser having an improved arrangement for sealing the membrane to the diffuser body. An enlarged sealing bead on the circumference of the membrane fits in an annular channel on the diffuser body. A retainer ring threads onto the diffuser body to compress the sealing bead against a base surface of the channel. A discontinuity on the base surface provides an effective seal with the bead without requiring undue tightening force of the retainer ring. The discontinuity may take the form of a ridge or a rut on the base surface of the channel.

11 Claims, 3 Drawing Sheets

DISK DIFFUSER WITH IMPROVED SEAL

CROSS-REFERENCE TO RELATED APPLICATIONS

None.

FIELD OF THE INVENTION

This invention relates generally to the diffusion of gas into liquid and deals more particularly with an improved sealing arrangement for disk diffusers.

BACKGROUND OF THE INVENTION

Disk diffusers are commonly used in a variety of gas diffusion applications, including the aeration and/or mixing of water and wastewater. Disk diffusers often use membranes having perforations which open when pressurized gas is applied to the system. Although membrane disk diffusers have been successful in large part, they have not been wholly without problems.

In particular, achieving an effective seal between the periphery of the membrane and the diffuser body has been difficult. One technique is to extend the membrane over the edge of the diffuser body and apply a clamping band around the diffuser body to secure the membrane and maintain a seal. This technique requires a stainless steel clamping band which is expensive and is also difficult to install and remove. At times, the membranes are blown off of the diffuser in this type of device.

Sealing small units is relatively easy because there is less surface to seal and less force required to create a reliable seal. For smaller units, the industry has moved in recent years toward the use of a threaded retainer ring to clamp the membrane in place. The membrane is provided with an integral circumferential sealing bead which acts as an O-ring type seal as well as an anchor that holds the membrane on the diffuser body when the retainer ring is tightened.

The effectiveness of the seal depends upon tightening the retainer ring enough that the integral sealing bead is fully compressed against the diffuser body. With larger diffusers, the force required to tighten the retainer ring sufficiently to prevent air leakage is substantial. Compounding this problem is the fact that the durometer and other characteristics of the membrane are selected for maximum oxygen transfer and aeration performance. Because the sealing bead is formed as part of the membrane, it necessarily has the same durometer and other physical characteristics as the membrane. This can compromise the ability of the sealing bead to effect a good seal. For example, the membrane durometer is typically relatively high for good oxygen transfer, but the hardness has the undesirable effect of requiring an excessively large force to compress the sealing bead.

There are other problems that can make the tightening force unduly high. The diffuser body may be warped or otherwise misshapened such that adequate contact between the membrane sealing bead and the diffuser body at all points is difficult to achieve. The diameter and shape of the sealing bead may be out of tolerance in some cases, or the membrane may be uneven or have flash from the manufacturing process that inhibits its ability to provide a uniform seal. Additionally, threads on the retainer ring may be imperfect or out of tolerance, thus preventing proper tightening of the retainer ring against the sealing bead.

Large disk diffusers are generally desirable for reasons of efficiency and economy. However, their size can result in extremely large force requirements for adequately compressing the membrane bead to create a gas tight seal. The added structural capacity that is necessary for the diffuser to withstand the large forces that need to be applied can lead to excessive costs. Mechanical leverage tools are often necessary, and they add to the costs that are involved and can result in over-tightening that creates a variety of adverse effects.

During operation in a wastewater treatment application or in many other applications, organic material, sand, grit and other substances can become lodged in the threads. Combined with the extreme tightening force that must be applied during installation, these materials can make it difficult to disassemble the diffusers for maintenance, repair, or replacement of the membranes. Not uncommonly, retainer rings or diffuser bodies are bent, broken, or otherwise damaged during disassembly efforts.

SUMMARY OF THE INVENTION

It is an important objective of the invention to provide an improved seal for the membrane of a disk diffuser. In accordance with the invention, this can be accomplished by providing a discontinuity or multiple discontinuities in the channel of the diffuser body which accepts the seal bead on the membrane. The bead can easily seal tightly against the discontinuity completely around the diffuser chamber without requiring undue force to tighten the retainer. As a consequence, the membranes are effectively sealed with only minimal torque required, and the units can be easily disassembled when necessary.

One form of discontinuity that works well is one or more ridges on the base surface of the channel in the diffuser body. Each ridge provides a raised surface against which the sealing bead can seal with easy deformation without requiring undue compression. Alternatively, the discontinuity can be a rut formed in the base surface of the channel, or any other geometry that allows for a tight seal without requiring a high force to compress the sealing bead.

Other and further objects of the invention, together with the features of novelty appurtenant thereto, will appear in the course of the following description.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DETAILED DESCRIPTION OF THE PREFERRED EMBODIMENTS

Figure 1:
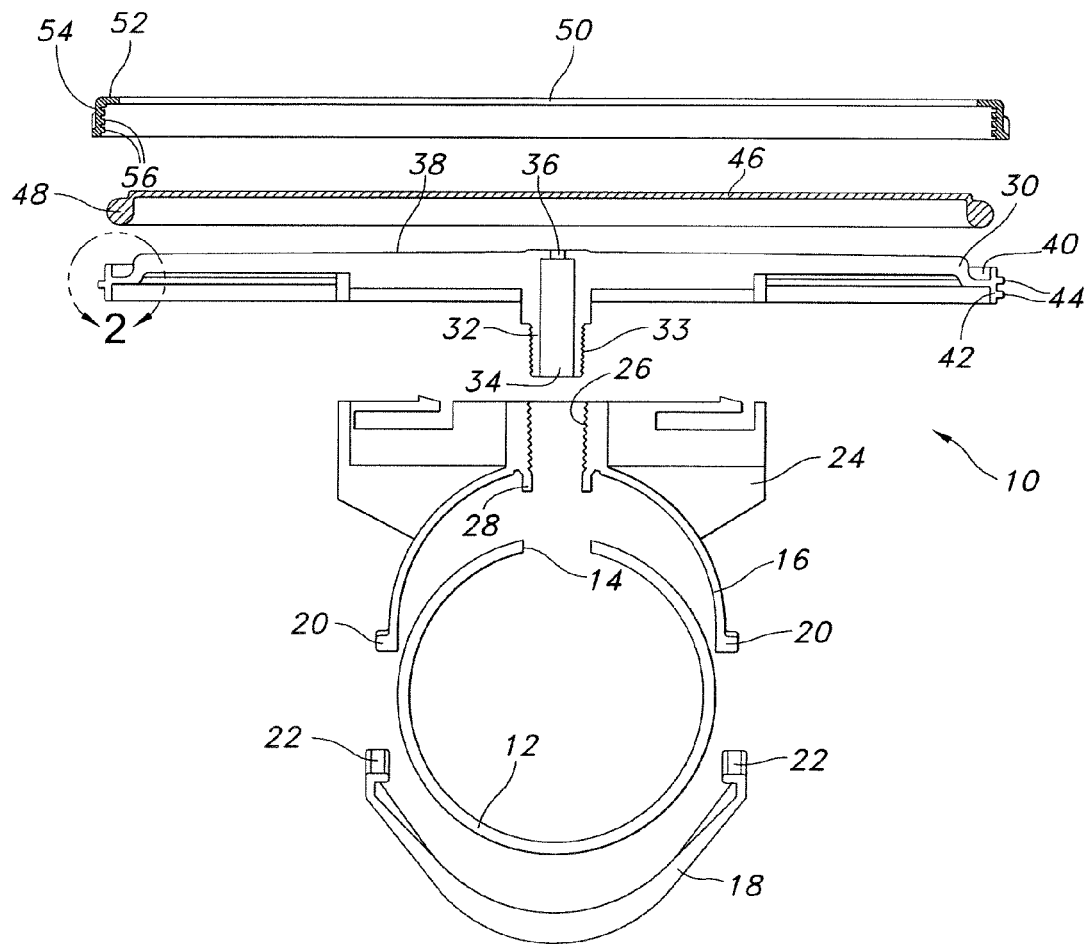
FIG. 1 is an exploded sectional view of a disk diffuser constructed according to a preferred embodiment of the present invention.

With initial reference to FIG. 1 in particular, the present invention is directed to a disk diffuser which is generally identified by numeral 10 and which may be used in a variety of applications involving the diffusion of gas into liquid, including the aeration and/or mixing of water and wastewater. The diffuser 10 may be mounted on a gas supply pipe 12 which receives gas from a blower or other source (not shown) and supplies the gas to the diffuser 10. The supply pipe 12 has a port 14 through which the gas is discharged to the diffuser from the interior of the supply pipe.

The diffuser 10 may be mounted on pipe 12 in any suitable manner, including through the use of a two-part saddle having an upper saddle section 16 and a lower saddle section 18. The upper and lower saddle sections 16 and 18 may be applied to the exterior surface of pipe 12 to surround it in a manner to essentially provide a double wall pipe. The lower edges of the upper saddle section 16 are provided with connectors 20 that mate with connectors 22 on the upper edges of the lower saddle section 18. When the two saddle sections 16 and 18 are applied to one another around pipe 12, the connectors 20 and 22 mate with one another in a wedging fashion to secure the saddle tightly around pipe 12.

The upper saddle section 16 is provided with a mounting base 24 for the diffuser 10. As shown in FIG. 1, the mounting base 24 has a cylindrical internally threaded passage 26. Extending around the lower end of the passage 26 is a cylindrical neck 28 on the mounting base 24. The neck 28 fits closely through the port 14 in the gas supply pipe 12.

The diffuser 10 has a discoidal diffuser body 30 which may be releasably attached to the mounting base 24. The center of the diffuser body 30 is provided with a downwardly extending barrel 32 which is externally threaded such that its threads may be threaded into the internal threads of passage 26 to secure the diffuser body 30 on the mounting base 24. Alternatively, the barrel 32 may be threaded directly to a tapped pipe to directly mount the diffuser 10. The barrel 32 has an internal vertical passageway 34 provided at its upper end with an orifice 36 extending to the top surface 38 of the diffuser body 30. The passageway 34 and orifice 36 provide a flow path for air from the interior of the supply pipe 12 to the top surface 38 of the diffuser body 30. An annular channel 40 extends circumferentially around the diffuser body 30 and opens upwardly. Immediately outwardly of the channel 40, the diffuser body 30 is provided with a rim 42 having threads 44 extending around it.

A circular disk membrane 46 is applied to the upper surface 38 of the diffuser body 30. The membrane 46 may be constructed of rubber, synthetic materials or any other suitable material. The membrane 46 has a flat upper surface that is perforated and flexible. Normally, the perforations are closed in the relaxed position of the membrane 46. However, when the membrane is expanded due to the application of gas under pressure, the perforations open and thereby provide paths for gas to discharge from the diffuser body 30 through the membrane 46 and into the liquid in which the diffuser 10 is immersed. The perforations are preferably small slits which discharge the gas in the form of small bubbles.

A circumferential sealing bead 48 is provided on the outside edge of the membrane 46. The sealing bead 48 may be formed integrally with the membrane 46 and has a size to fit in the annular channel 40 of the diffuser body 30. A retainer ring 50 may be used to secure the membrane 46 to the diffuser body 30. The retainer ring has a flat annular inwardly projecting flange 52 forming its upper surface. A circular rim 54 connects with the outer edge of the flange 52 and may have threads 56 on its inside surface to mate with the threads 44 on the diffuser body 30.

Figure 2:
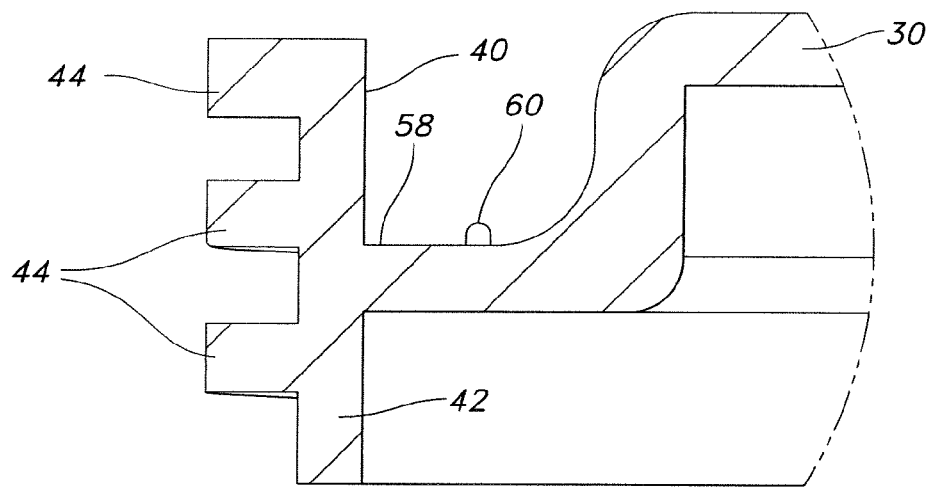
FIG. 2 is a fragmentary cross-sectional view on an enlarged scale of the detail identified by numeral 2 in FIG. 1.
Figure 3:
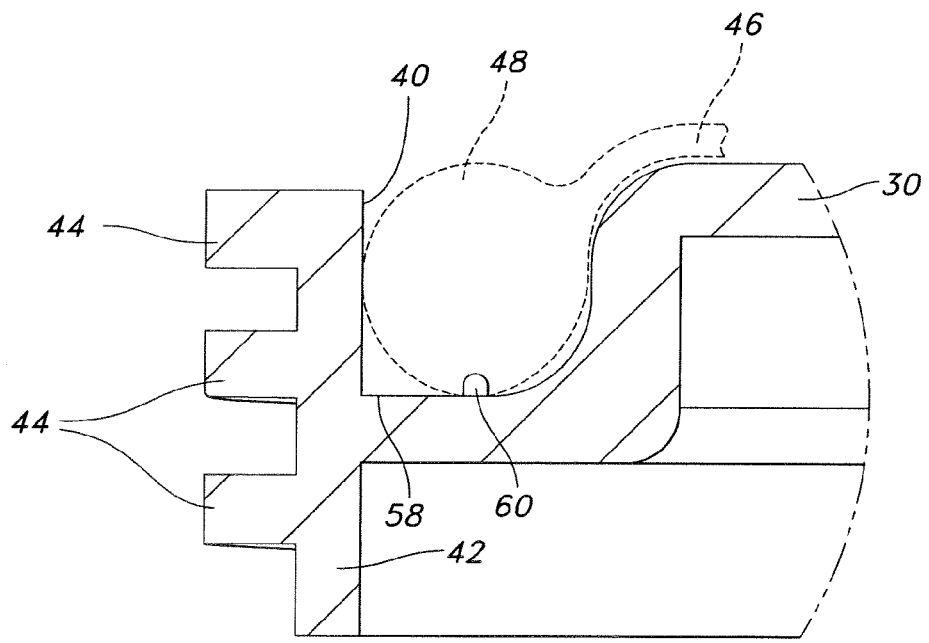
FIG. 3 is a fragmentary cross-sectional view similar to FIG. 2 but showing in broken lines a disk membrane sealing bead received in a channel on the diffuser body.

In accordance with the present invention, and as best shown in FIGS. 2 and 3, the channel 40 of the diffuser body 30 may have a base surface 58 which is generally flat and annular or otherwise shaped to receive the membrane bead 48. The base surface 58 is provided with a discontinuity which may take the form of a small ridge 60 extending upwardly from surface 58. The ridge 60 may be rounded to provide a curved upper surface 62 which engages the sealing bead 48 of the membrane 46. Ridge 60 is annular and extends continuously around the diffuser body 30 at a location which is preferably at about the center of the radial dimension or width of surface 58.

The diffuser 10 may be assembled by applying the membrane 46 to the top surface 38 of the diffuser body 30 with the sealing bead 48 fitting in channel 40. The retainer ring 50 may then be applied with its threads 56 threading onto the threads 44 of the diffuser body. As the retainer ring 50 is tightened, its upper flange 52 presses downwardly on the sealing bead 48 and compresses it in the channel 40 against the ridge 60, as shown in FIG. 3. The bead 48 is able to engage ridge 60 along its entire circumference and to overlap the inside and outside surfaces of the ridge 60. In this manner, the sealing bead 48 effects a gas tight seal against the ridge 60 without requiring the retainer ring 50 to be tightened with undue force. It is contemplated that only hand pressure is necessary to tighten the retainer ring 50 sufficiently to obtain an adequate seal between the membrane sealing bead 48 to the ridge 60. The retainer ring 50 thus creates an effective seal between the membrane and diffuser body and also holds the membrane securely in place on the diffuser body. Because the bead 48 must be compressed only in the small area adjacent to the ridge 60, the force required for an effective seal is reduced significantly.

The diffuser 10 may then be threaded onto the mounting base 24. When gas pressure is applied to the supply pipe 12, the gas passes through the passageway 34 and orifice 36 against the underside of the flexible membrane 46, thus expanding the membrane and causing its perforations to open such that the gas is transmitted through the perforations in membrane 46 into the liquid in which the diffuser 10 is immersed.

The diffuser 10 can be disassembled by unthreading the retainer ring 50 to release the membrane 46 which can then be inspected, repaired and/or replaced if necessary prior to reassembling the diffuser. Because only a small force is used to install and secure the membrane 46, disassembly can be carried out easily with minimum force and without damaging the diffuser body 30, the retainer ring 50, the membrane 46 or the threads 44 and 56.

Figure 4:
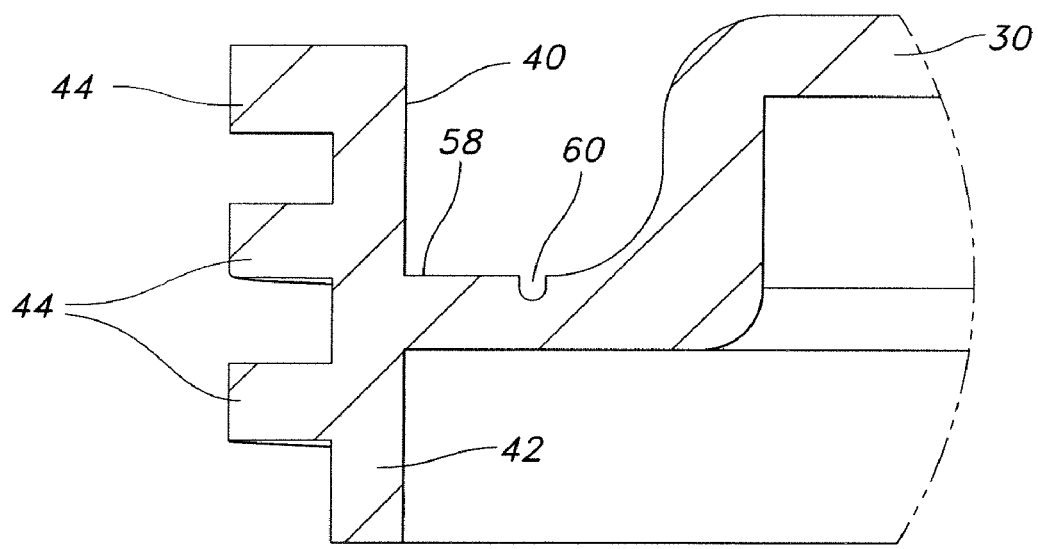
FIG. 4 is a fragmentary cross-sectional view similar to FIG. 2 but showing a modified embodiment of the invention.
Figure 5:
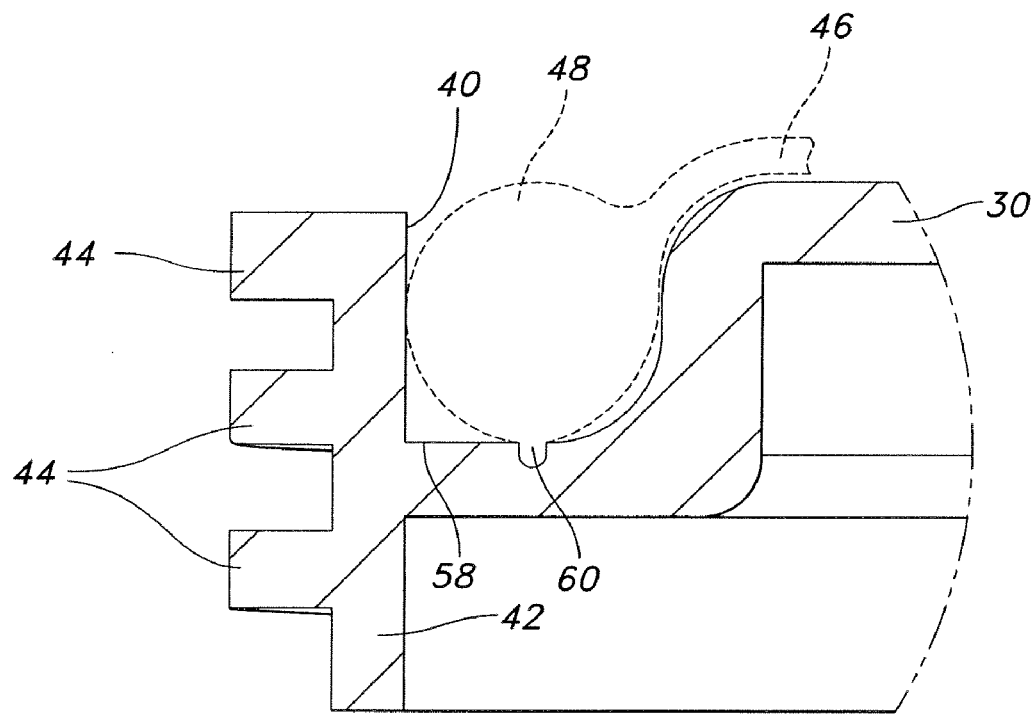
FIG. 5 is a fragmenting cross-sectional view similar to FIG. 4 but showing in broken lines a disk membrane sealing bead received in the diffuser body channel.

The ridge 60 provides a discontinuity in the base surface 58 of the channel 40 and thus allows an improved seal to be effected without requiring undue tightening force. The same result can be achieved by the embodiment shown in FIGS. 4 and 5, in which the ridge 60 is replaced by a discontinuity in the form of a trough or rut 64 formed in the base surface 58. The rut 64 provides a recess into which the sealing bead 48 can be pressed to seal against the edges 66 and 68 formed at the intersection between the base surface 58 and the rut 64, as shown in FIG. 5. The rut is annular and extends continuously around the diffuser body 30, preferably at a location near the center of the radial or width dimension of surface 58.

It is preferred that the ridge 60 and/or the rut 64 be located near the center of the radial dimension of base surface 58 so that the seal is effected at a central location on the channel 40. It is contemplated that more than one of the ridges 60 may be used in some applications, that more than one of the ruts 64 may be used in other applications, or that a combination of ridges and ruts may be used in some applications. There are other types of discontinuities and geometries that can be provided to create enhanced sealing with the sealing bead 48 on the flexible membrane 46.

Optionally, the discontinuity may be located in or on the membrane bead 48 at a location where it confronts and seals against surface 58. When the discontinuity is on the bead 48 rather than on surface 58, the discontinuity can take the form of a ridge, rut or any other suitable structure or configuration such as a flap.

The present invention is useful in various applications, including applications where a ceramic disk diffuser is to be converted to a flexible membrane diffuser. In this situation, the body of the ceramic diffuser is provided with a backer plate which occupies the volume occupied by the ceramic media before its removal. A new flexible disk membrane can then be applied over the backer plate to lie flatly against it for proper operation. The flexible membrane has a peripheral sealing bead such as bead 48 which seals in the diffuser body channel against a discontinuity such as a bead or ridge.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. Apparatus for diffusing gas into liquid, comprising:
   a pipe immersed in the liquid and receiving the gas;
   a diffuser body mounted on the pipe and arranged to receive gas from the pipe;
   a generally annular channel on said diffuser body having a base surface;
   a flexible membrane on said diffuser body having perforations for discharging gas therethrough into the liquid, said membrane having a generally annular sealing bead in said channel;
   a retainer ring having a threaded connection with said diffuser body to press said bead against said base surface when said ring is tightened; and
   a discontinuity comprising a ridge projecting from said base surface adapted for engaging said bead and effecting a seal between said bead and said base surface when said ring is tightened.

2. Apparatus as set forth in claim 1, wherein said ridge has a curved configuration for contact with said sealing bead.

3. Apparatus as set forth in claim 1, wherein said bead is sized and adapted to fit with said annular channel of said diffuser body and be engaged by said ridge when said ring is tightened.

4. A diffuser for diffusing gas into liquid, comprising:
   a generally discoidal diffuser body for receiving the gas;
   a generally annular channel on said diffuser body having a base surface;
   a flexible membrane perforated to apply gas therethrough to the liquid;
   a peripheral sealing bead on said membrane fitting in said channel;
   a retainer ring threaded onto said diffuser body to press said bead against said base surface; and
   a geometric discontinuity in said base surface adapted for engaging said bead and providing a structure against which said bead effects a gas tight seal when said retainer ring is threaded onto said diffuser body.

5. Apparatus as set forth in claim 4, wherein said discontinuity comprises a ridge projecting from said base surface.

6. Apparatus as set forth in claim 5, wherein said ridge has a curved configuration for contact with said sealing bead.

7. Apparatus as set forth in claim 4, wherein said discontinuity comprises a rut in said base surface.

8. In a gas diffusion system having a pipe immersed in liquid and receiving gas for diffusion into the liquid, the combination of:
   a diffuser body for receiving gas from said pipe and having a channel extending around said diffuser body, said channel having a base surface;
   a flexible membrane on said diffuser body having perforations through which gas is discharged and a sealing bead located in said channel;
   a retainer secured to said diffuser body in a manner to press said sealing bead against said base surface; and
   a discontinuity on said base surface extending around said channel, said discontinuity adapted for engaging said bead to effect a seal between said bead and said base surface in said channel.

9. Apparatus as set forth in claim 8, wherein said discontinuity comprises a ridge projecting from said base surface.

10. Apparatus as set forth in claim 9, wherein said ridge has a curved configuration for contact with said sealing bead.

11. Apparatus as set forth in claim 8, wherein said discontinuity comprises a rut in said base surface.

* * * * *